US007821178B2

(12) United States Patent
Camwell et al.

(10) Patent No.: US 7,821,178 B2

(45) Date of Patent: Oct. 26, 2010

(54) BRUSH AND BRUSH HOUSING ARRANGEMENT TO MITIGATE HYDRODYNAMIC BRUSH LIFT IN FLUID-IMMERSED ELECTRIC MOTORS

(75) Inventors: Paul L. Camwell, Calgary (CA); Anthony R. Dopf, Calgary (CA); Derek W. Logan, Calgary (CA); Timothy Neff, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 582 days.

(21) Appl. No.: 11/431,636

(22) Filed: May 11, 2006

(65) Prior Publication Data

US 2006/0261701 A1 Nov. 23, 2006

Related U.S. Application Data

(60) Provisional application No. 60/682,811, filed on May 20, 2005.

(51) Int. Cl.
*H02K 5/14* (2006.01)
*H02K 13/00* (2006.01)

(52) U.S. Cl. .......................................................... 310/239

(58) Field of Classification Search ................. 310/239, 310/248, 87, 54; 417/423.7, 423.3
See application file for complete search history.

(56) References Cited

U.S. PATENT DOCUMENTS 3,171,050 A * 2/1965 Gordon ...................... 310/239
3,353,047 A * 11/1967 Buchwald ................... 310/247
4,160,629 A * 7/1979 Hidden et al. .............. 418/55.3
4,619,588 A * 10/1986 Moore, III .................. 417/366
2006/0261701 A1* 11/2006 Camwell et al. ............ 310/239

FOREIGN PATENT DOCUMENTS

JP 02174533 * 7/1990

OTHER PUBLICATIONS

Grossman, M.I., et al. Elecktromashinostroenie i Elektrooborudovanie, No. 25, 1977, p. 107-110 and the English translation.

* cited by examiner

*Primary Examiner*—Karl I Tamai

(57) ABSTRACT

A direct current electric motor brush and brush housing arrangement which significantly reduces the effect of brush lift in a brushed motor containing viscous fluid. The brush housing enables viscous fluid to avoid momentum transfer into the brushes by providing two or more pressure relief channels that provide the fluid with direct radial exits along the direction of the brush, potentially reducing the brush lift due to the fluid being forced between a rotating commutator and its associated brushes. The pressure relief channels may be located in the housing immediately adjacent to the brush, being radially disposed to the leading face (or leading and trailing faces) of each brush, or in the leading face (or leading and trailing faces) of each brush itself, and may include additional channels in the housing near but not immediately adjacent the brushes.

14 Claims, 6 Drawing Sheets

BRUSH AND BRUSH HOUSING ARRANGEMENT TO MITIGATE HYDRODYNAMIC BRUSH LIFT IN FLUID-IMMERSED ELECTRIC MOTORS

CROSS-REFERENCE TO RELATED APPLICATION

This application claims priority under 35 U.S.C. §119(e) to U.S. application having Ser. No. 60/682,811, filed May 20, 2005, the entirety of which is incorporated by reference herein.

FIELD OF THE INVENTION

This invention relates to electric motors, and more particularly to electric motors that require brushes in contact with the motor's armature, particularly when the motor is run while immersed in a fluid.

BACKGROUND OF THE INVENTION

Modern drilling techniques employ an increasing number of sensors in downhole tools to determine downhole conditions and parameters such as pressure, spatial orientation, temperature, gamma ray count etc. that are encountered during drilling. These sensors are usually employed in a process called 'measurement while drilling' (MWD). The data from such sensors are either transferred to a telemetry device, and thence up-hole to the surface, or are recorded in a memory device by 'logging'.

The oil and gas industry presently uses a wire (Wireline), pressure pulses (Mud Pulse—MP) or electromagnetic (EM) signals to telemeter all or part of this information to the surface in an effort to achieve near real-time data. The present invention is specifically useful for a certain class of MP systems, although it can be useful in other telemetry or downhole control applications.

There is a need to control certain mechanical devices such as valves or actuators in many drilling applications and these usually employ electric motors. In such situations, the motor is required to run in a pressure-compensated housing in order to offset large external pressures (usually up to 20,000 psi). In the drilling environment these motors are generally one of two types—brushless or brushed. Both have their advantages and disadvantages—for instance brushed motors do not require sophisticated control circuits and are relatively efficient, and brushless motors have finer positional and rotational control. It is important to note that volume constraints are particularly severe in this environment, so electric motors that make optimum use of their armature coils are normally of the 3-phase variety.

A major issue to be overcome when utilizing most electric downhole motors is that they usually need to move a shaft or lever that is within the external high-pressure environment. In most cases this implies that a high-pressure seal is necessary in order to protect the motor and its associated control electronics at low pressure from ingress by the drilling fluid ('mud'). Thus the seal must withstand a pressure differential of up to 20,000 psi, often at temperatures of 150° C. to 175° C. This is known to be a point of failure and can absorb significant energy in the form of friction to ensure that the seal is robust enough to withstand the differential pressure. A common method of minimizing this problem is to immerse the motor in an oil bath and communicate the external pressure of the mud to the internal oil via a deformable membrane, such as a rubber sheath. This has the effect of reducing the pressure across the seal to a few psi, thereby requiring a less robust seal that will absorb much less energy from the power source running the motor. The pertinent design issues now involve utilizing an electric motor that can run well while being completely immersed in oil. It is for this reason that most downhole designs make use of brushless motors because they avoid the issue that brushed motors must operate with their commutators and associated brushes in continuous contact. The essential problem is that the commutator is usually rotating at between 2,000 to 6,000 revolutions per minute and at this speed the oil is dragged around by both the armature and the commutator, the latter tending to lift the brushes away as the entrained oil is dragged between them—the 'hydroplaning' effect. As soon as the brushes lose contact with the armature the current to the motor stops and power—and control—is lost. A brushless motor has advantages in this respect.

In MP telemetry applications there is a class of devices that communicate by a rotary valve mechanism that periodically produces encoded downhole pressure pulses on the order of 200 psi. These pulses are detected at the surface and are decoded in order to present the driller with MWD information in order to steer the well. These rotary valves are preferentially driven by electric gearmotors, and as the forgoing implies, they will usually be electric and brushless. Because the motors are invariably powered by primary cell batteries it is important that they are efficient. Under conventional circumstances, such as surface applications at atmospheric pressure and with no particularly onerous packaging constraints, the requirements of reliable motor control, motor efficiency and output shaft positional accuracy (in order to set the valve appropriately) are not particularly challenging. But when the downhole motor is brushless and immersed in an oil bath subject to high pressure the need for positional accuracy generally leads to a loss of efficiency, as will be explained as follows.

To achieve the optimum motor torque-speed curve in small motor downhole applications normally requires the motor speed to be typically at least 2,000 rpm. The final valve output mechanism will usually increase and decrease pressure in the mud at a rate of 0.5 to 2 bits per second. This implies that the motor must be geared down in order to match these rates, and also to generate the necessary torque applied to the valve itself so that adequately large pressure pulses can be developed. The valve mechanism in most cases needs the motor to stop and start at specific output positions so that the pressure increase and decrease is well defined according to the prevailing telemetry protocol. Thus the final mechanical valve positional outputs must be monitored, and this information communicated to the motor controller. In a brushless geared-down electric motor as described the necessary output shaft position is normally achieved by some sort of sensor, typically an encoding optical disc; the motor speed and control is by a microprocessor circuit. Both of these means utilize semiconductor components. Problematically, the semiconductors (transistors, diodes, integrated circuits etc.) must be isolated from high pressure or else they will collapse and fail. In situations where pressure must be tolerated the solution for a brushless motor is that one of the armature coils (typically one of three) is used as a sensor to determine speed and position instead of it being used to power the output shaft. This has the effect of significantly reducing the efficiency of a brushless motor. Further, a relatively complicated electronic control circuit housed in a low-pressure environment must be employed.

In summary:

- the downhole valve rotary mechanism in most cases requires a rotary output shaft
- this implies the beneficial use of a geared-down electric motor
- in order to reduce the friction generated by the high differential pressure across the seal separating the external drilling fluid from the internal mechanisms a pressure-compensated housing is employed
- the fluid utilized to resist the external pressure is typically oil
- the electric motor running in the oil (of finite viscosity) will not suffer brush problems if the motor is brushless
- this implies the brushless motor's control and position circuits must be isolated from high pressure
- the present state of the art means of achieving brushless motor control and accurate output position employs one of the motor's armature coils
- this loss of typically ⅓ of the power-producing coils leads to a serious loss of system efficiency It is generally well known that if a brushed motor has to be used the brush lift can be reduced to some extent by some or all of the following means:

- reduce the motor's rotational speed
- use oil of a lower viscosity
- increase the spring force pushing the brushes into the commutator
- modify the brush by inserting grooves in its bearing surface adjacent to the commutator These conventional methods have only limited success, particularly if each parameter has been increased to its practical limit. There have been some attempts to shield the brushes by judicious use of fixed plates (see Grossman, M. I. et al., Elektromashinostroenie i Elektrooborudovanie, no. 25, 1977, p. 107-110), but this type of technique adds significant mechanical complexity and cost. In the downhole industry, present knowledge constrains downhole tool designers to utilize brushless motors in almost all downhole applications.

SUMMARY OF THE INVENTION

The present invention counters the desirability or necessity of implementing a brushless motor by introducing a novel aspect relating to the brush housing.

It is an object of the present invention to show how a brushed motor can run at high speed in oil without suffering the normal associated brush lift problems. This has the benefit that a more efficient and simple motor system can be utilized, particularly in oil and gas drilling downhole MP telemetry applications. This is demonstrated by showing the causes of brush lift in fluids of significant viscosity and undertaking a simplified analysis of hydrodynamic lift. The present means of offsetting the lift in our industry is also confirmed as inadequate based on research and experimentation. Mitigation means are extended in order to reduce the lift effect to negligible proportions.

It is an object of the present invention to overcome the deleterious and unintended effects of the brushes lifting when the electric motor is run in oil, and conventional means of stopping this effect have failed. The applications specifically apply to a class of downhole MWD tools, but the present invention is not limited to this scope—it applies to any brushed electric motor that suffers from brush lift due to the entrained fluid around the commutator being viscous enough to cause brush lifting (hydroplaning), as would be obvious to anyone skilled in the particular art.

By a simplified analysis of fluid flow around a generic cylinder the underlying forces that cause brushes to lift away are demonstrated, and by extension, it is demonstrated how to reduce these forces by providing pressure relief ports. The preferred embodiment described below is pertinent to small motors running at a few thousand rpm in light oil, but the present invention can be generally applied to other applications for motors in non-downhole environments.

BRIEF DESCRIPTION OF THE DRAWINGS

In the accompanying drawings, which illustrate an exemplary embodiment of the present invention.

DETAILED DESCRIPTION OF A PREFERRED EMBODIMENT

For ease of reference, like components of the various figures are identified where possible by the same reference numbers.

Figure 1:
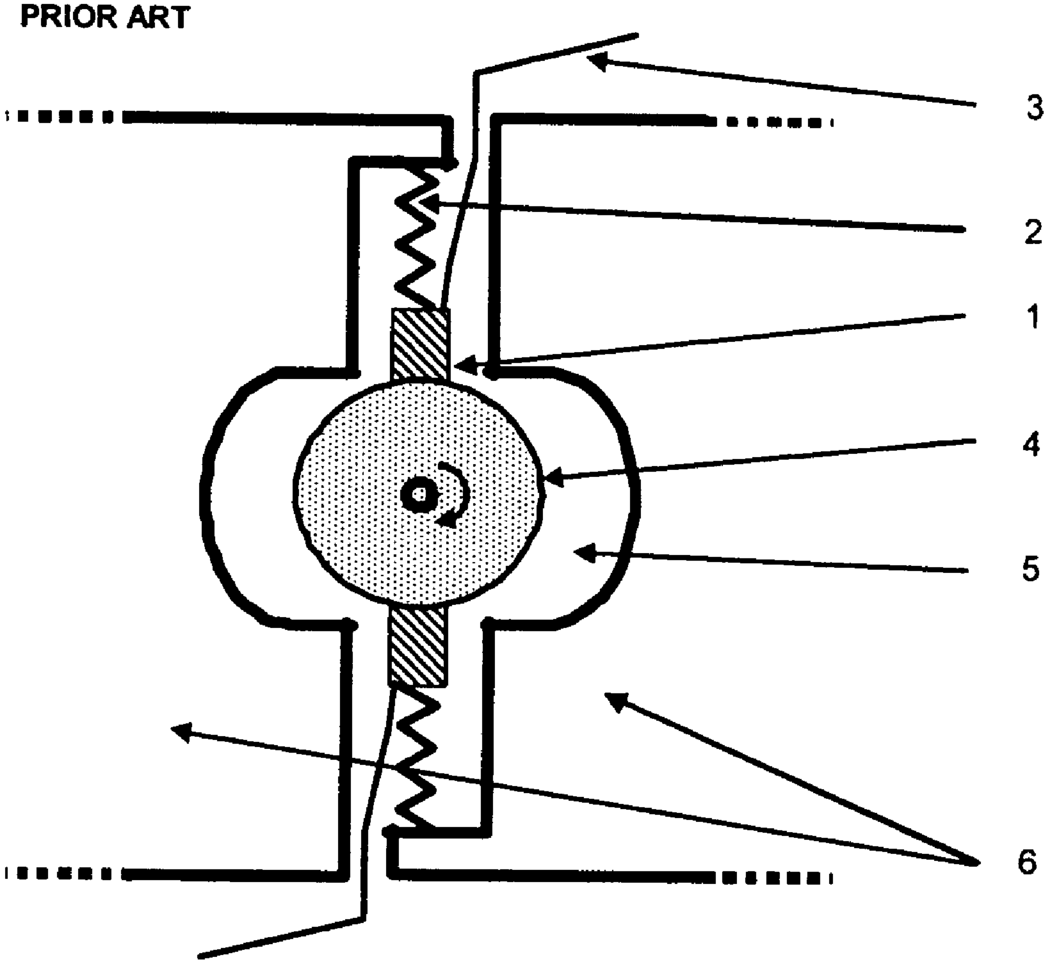
Figure 1 PRIOR ART
FIG. 1 is a representation of a prior art part of a simple dc motor armature with its power source comprising in part two brushes disposed around a rotating commutator in an insulating housing.

Referring to FIG. 1 (prior art), a simple dc electric motor is energized by current flowing along current conductors 1 via carbon brushes 3 and on into the commutator 4. The brushes are held firmly against the commutator via springs 2. The rotating parts of the motor (armature) are constrained by a mechanical housing 6 that also utilizes an oil-filled space 5 wherein the oil acts as a pressure compensation fluid. The disadvantage of allowing oil to be in close contact with the rotating parts of the motor, particularly the commutator 4, is that oil is swept around by the commutator's motion and often forces its way between brush 3 and commutator 4, thus lifting the brush 3 and causing a current interruption, to the detriment of the motor's operation.

Figure 2:
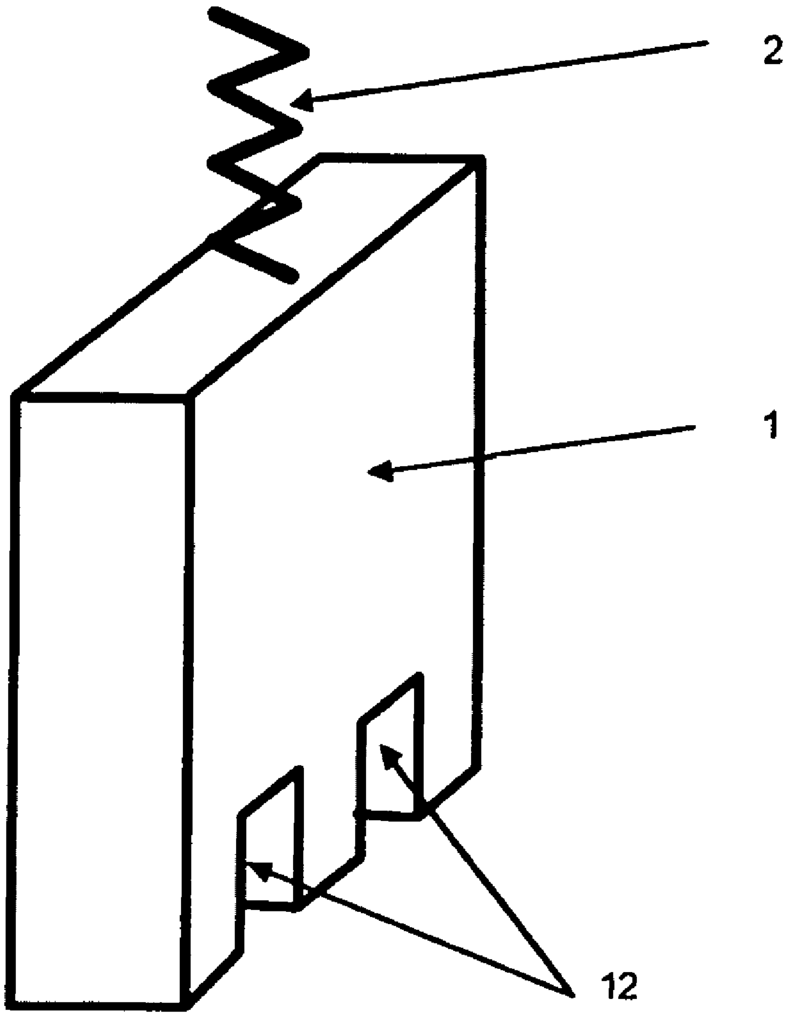
Figure 2 PRIOR ART
FIG. 2 illustrates how a simple brush can be modified to incorporate grooves to enable the easier passage of rotationally-entrained oil.

Referring to FIG. 2 (prior art), two simple means can be employed to mitigate the effect of the rotationally entrained oil from lifting the brush—bypass grooves 12 can be cut into the brush 1 in the direction of travel, and the springs 2 that force the brush 1 against the commutator can be made stiffer. It is obvious to one skilled in the art that a further advantage can sometimes be gained by making the oil of as low a viscosity as is practical. However, it has been found that these simple means are not always effective in addressing the problem of brush lift.

Figure 3:
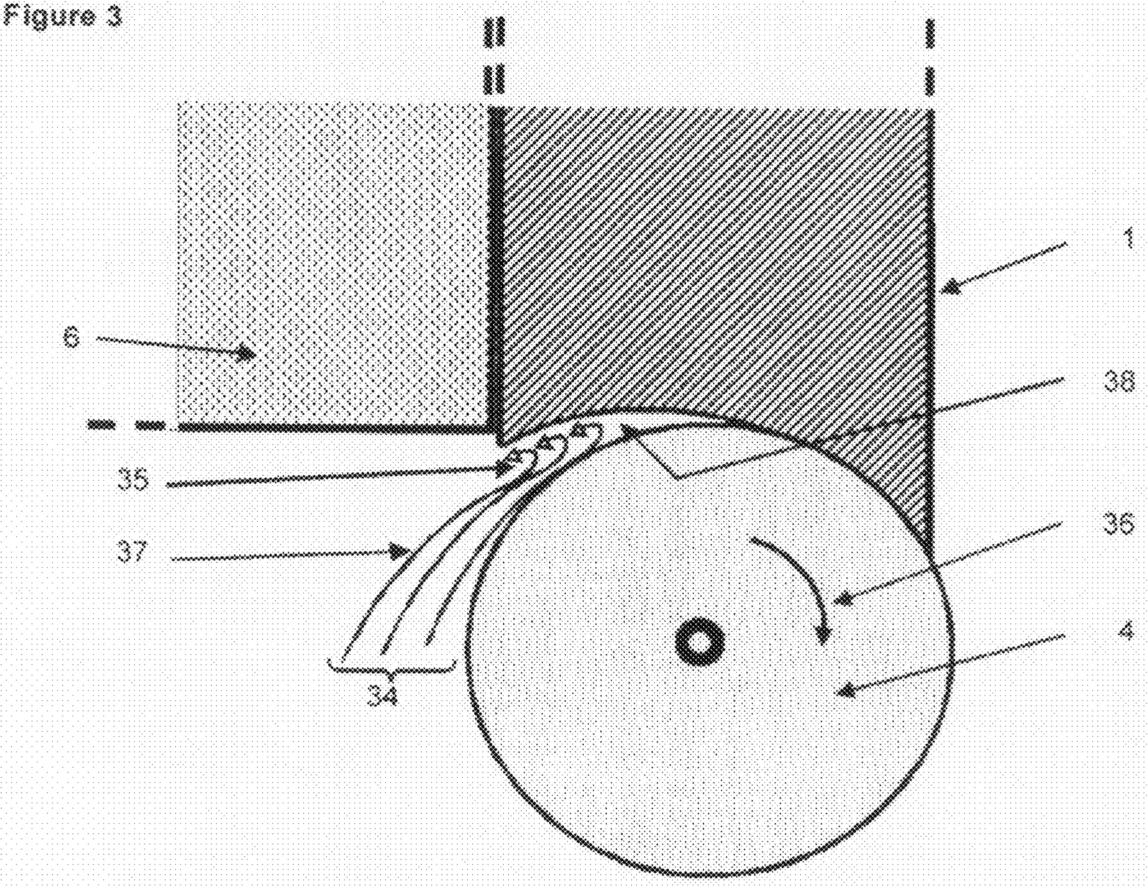
FIG. 3 illustrates how entrained oil can be swept under the leading edge of a brush, causing potential lift.

FIG. 3 illustrates an enlarged view of an area of the motor. It has been noted that the brushes 1 rarely form a profile that matches the circular shape of the commutator 4, particularly if the motor has occasion to run in the reverse direction from normal 36. This is partly a consequence of the friability of the carbon and the lack of perfect location of the brush 1 by the housing 6. The pertinent effect is that a 'pocket' or wedge 35 is formed at the leading edge, enabling the entrained oil 34 to dynamically collect in the available volume between brush 1 and commutator 4. It is now obvious that the wedge would deleteriously grow larger, ultimately lifting the brush 1 off the commutator 4 if the rotational speed is increased, the oil was more viscous (perhaps by lowering the temperature or allowing contamination), the spring force weakens, or a combination of all these effects.

It remains to be shown how oil being dragged in a tangential direction can provide a perpendicular force to the axis of the commutator, thereby lifting the brushes against the action of their springs. Once this is understood, means can be assessed to mitigate or reduce this force.

The following analysis breaks the problem into two parts—(1) how much entrained oil is effective in being forced against each brush, and (2) once the oil does impinge on the brush, how this translates from a tangential to a radial force.

Entrained Oil:

Assume the oil flows (is dragged around) in the space 5 between the rotating commutator 4 and the stationary housing 6 (as shown in FIG. 1). The velocity of the oil will be a maximum at the surface of the commutator 4 and a minimum at the housing 6. The velocity profile (velocity v vs. distance r out from the commutator) will be governed by some relationship (see for instance Poiseuille's law, or Couette flow, described at http:/hyperphysics.phy-astr.gsu.edu/hbase/pfric.html, one amongst many sources). For illustrative purposes a general exponential relationship can be reasonably determined and followed through in order to understand the major parameters that can be expected to play a role in the transport of oil around the commutator and potentially under the brushes.

Consider $$v=v_c\exp(-r/k\eta) \quad [1]$$

where v velocity of the entrained oil, $v_c$=velocity at the outer edge of the commutator, r=radial distance away from the commutator, k=constant chosen to best fit experimental results, and η=oil viscosity.

Plotting v against r produces a family of curves showing that velocity v falls from a maximum velocity $v_c$ with increasing r for each given value of η. Increasing η flattens out the profile from an obvious negative exponential toward a more linear response. Equation [1] can be easily integrated to determine the average oil velocity $v_a$ out to some distance $r_a$ from the commutator. This yields:

$$v_a=(k\eta v_c/r_a)(1-\exp(-r_a/k\eta)) \quad [2]$$

where $r_a$=an average distance from the commutator.

If $r_a>>k\eta$, then Equation [2] simplifies to:

$$v_a=k\eta v_c/r_a \quad [3]$$

Equation [3], while oversimplifying the real situation, does confirm the intuitive importance of the various parameters. For instance, the entrained rotating oil velocity at a given distance from the commutator is directly proportional to the viscosity and the commutator rotational speed, and is inversely proportional to the distance from the rotating surface of the commutator. The oil's maximum velocity matches that of the commutator when r=0, and average velocity of the oil that is forced into the wedge 35 of FIG. 3 is predicted by $v_a$ at a given $r_a$. This distance is made commensurate with the size of the wedge. One can now use Equation [3] to estimate the lifting force on the brushes.

Radial Force:

FIG. 3 shows how the oil 34 is forced into the wedge 35, follows some profile 37 and curls around under the brush 1, forming a stagnation point 38. Note that if the majority of the oil 34 forced into the wedge 35 were able to continue in the direction of the rotating commutator 36 there would be no stagnation point, simply constrained flow under the brush 1.

If we assume that oil moves towards the stagnation point at an average velocity of $v_a$, the momentum in the direction of travel has to equate to zero because the oil curls back and continues around the oil-filled space contained by the housing. Using the law of Conservation of Momentum, we can expect that the force on the oil in the wedge exactly matches that necessary to reduce the momentum to zero.

Figure 3A:
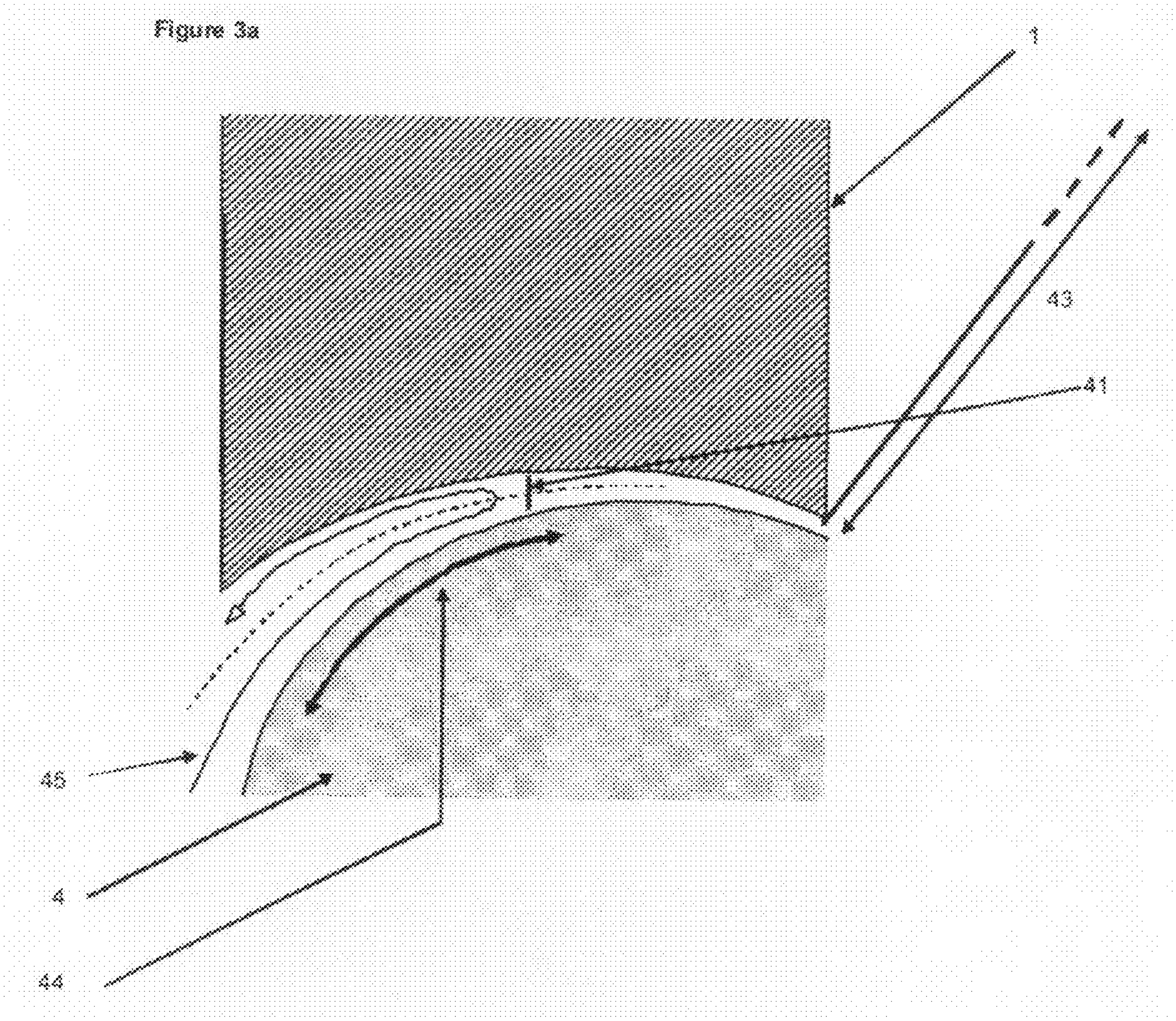
FIG. 3*a* illustrates the idealized flow profile entrained oil in the wedge formed just under the leading edge of the brush and the commutator.

Referring now to FIG. 3*a*, and assuming that the average height of the wedge 41 is h, it follows that the volume $V_s$ of the incoming 'stalled' fluid is:

$$V_s=d(h/2)w$$

where d defines a representative distance 44 under the wedge, w defines the width 43 of the brush and $v_a$ from Equation [3] is the average velocity of the oil 45 entering into the wedge.

The mass of oil is given approximately by:

$$M=\rho V_s,$$

where ρ is the oil density.

The time for the oil to change velocity from $v_a$ to zero is given by:

$$T_d=d/v_a$$

Thus, the force F (rate of change of momentum) on the oil is given by:

$$F=M\,v_a/T_d=M(v_a)^2/d \quad [4]$$

Because oil is an isotropic fluid and relatively incompressible, any force or equivalently any pressure acting upon it is measured to be the same in all directions. Thus the force that changed the momentum to zero can be translated to a force F that acts radially to the commutator, in effect causing a lifting pressure on the brush. From Equation [4] and various substitutions it can be shown that:

$$F=(\rho hw/2)(v_a)^2 \quad [5]$$

Substituting for $v_a$ into Equation [5] and simplifying yields:

$$F=(K)(w/h)(\rho)(\eta v_c)^2 \quad [6]$$

where we make the simplifying assumption that $r_a$ is equivalent to h/4 (as is evident from FIG. 3*a*) and $K=8\,k^2$.

Thus Equation [6] predicts that the radial force that can potentially cause brush lift comprises a geometrical term, a term that depends linearly on density and a term that depends on the square of the viscosity and the commutator velocity. When the force due to the momentum change imposed on the oil by being made to change direction within the wedge between commutator and brush equals or exceeds the spring force (assuming the weight of the brush under gravity is negligible) then the phenomena of brush lift occurs. Laboratory experiments have confirmed the sensitivity of brush lift to the dimensions of the wedge (the geometrical term), the density of the oil and most importantly an approximately quadratic sensitivity to viscosity and rotational velocity.

Figure 4:
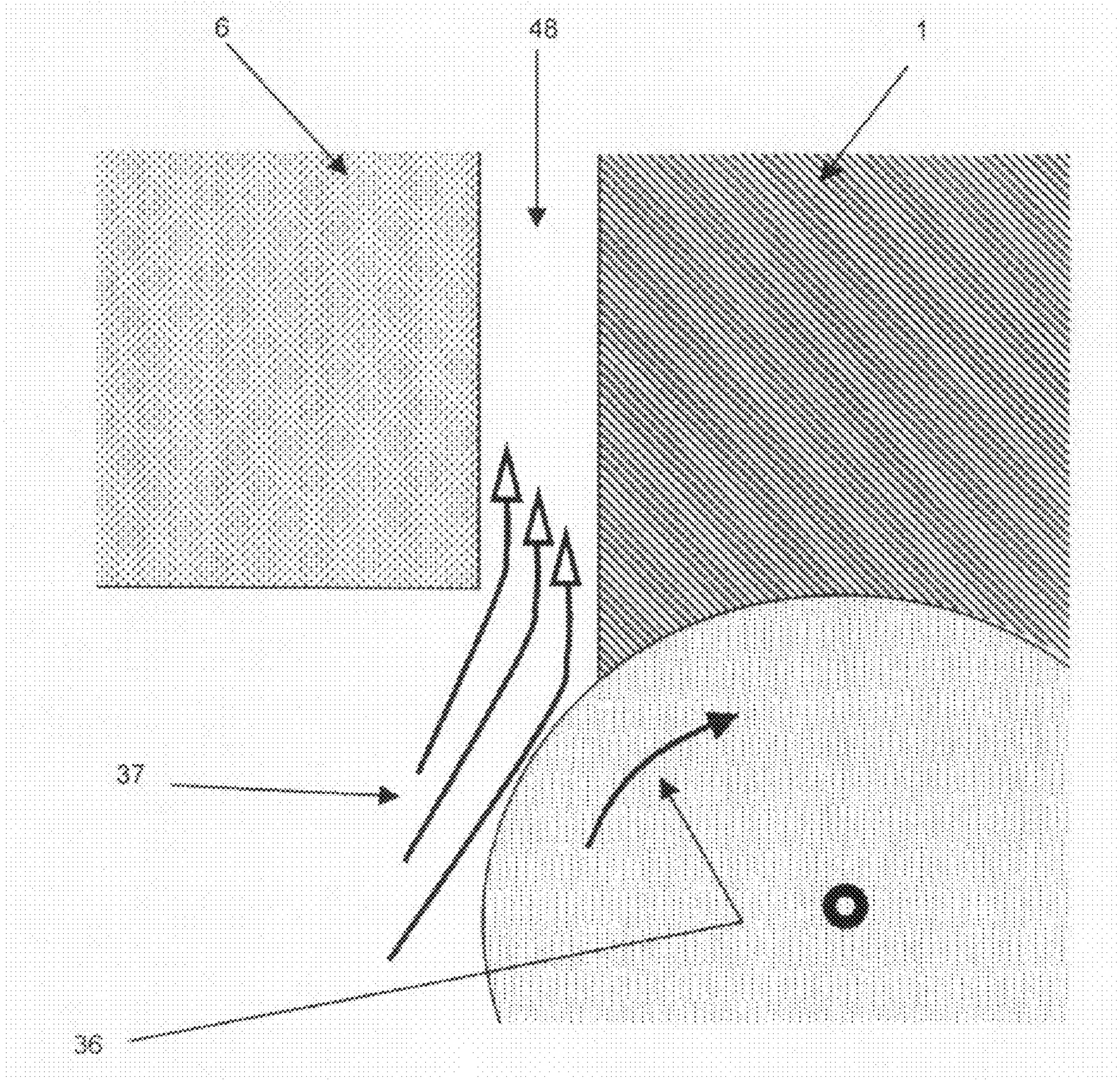
FIG. 4 is similar to FIG. 3, but has incorporated a representative pressure relief channel.

Given the present understanding that prior to brush-lift the pertinent forces on the brush are caused primarily by the fluid dynamically trapped under the leading edge of the brush being forced to radically change direction, the issue is what to do to reduce the radial force. In accordance with the present invention, reference to FIG. 4 illustrates means to allow the majority of oil being swept round by the commutator an alternative escape route rather than entering and then leaving the wedge, which in the preferred embodiment comprises a relief channel or channels 48 immediately in front of the wedge. It is most preferable to provide a radial groove, which may be conveniently placed in the housing 6, that will facilitate the modification of the oil flow profile 37 as shown, whereby the majority of the entrained oil simply turns through a relatively gradual 90 degrees, exiting along the relief channel 48 without providing any momentum transfer under the brush 1, which would otherwise result in radial lift. The shape of channel enables the majority of the flow just in front of the wedge to depart from tangential to radial streamline flow, thus avoiding a sharp change in direction underneath the brush.

A radial force due the frictional drag of the oil on the brush may now be present, but this effect can be offset by making the width of the channel 48 at least 25% to 35% of the width of the brush 1, and similarly at least 20% of the depth, thereby reducing the radial velocity of the oil to a relatively negligible value.

In an alternative embodiment, it is apparent that the pressure relief channel could similarly have been implemented in the brush itself, resulting in equally beneficial effects. The actual location of implementation is simply a matter of convenience.

Figure 5:
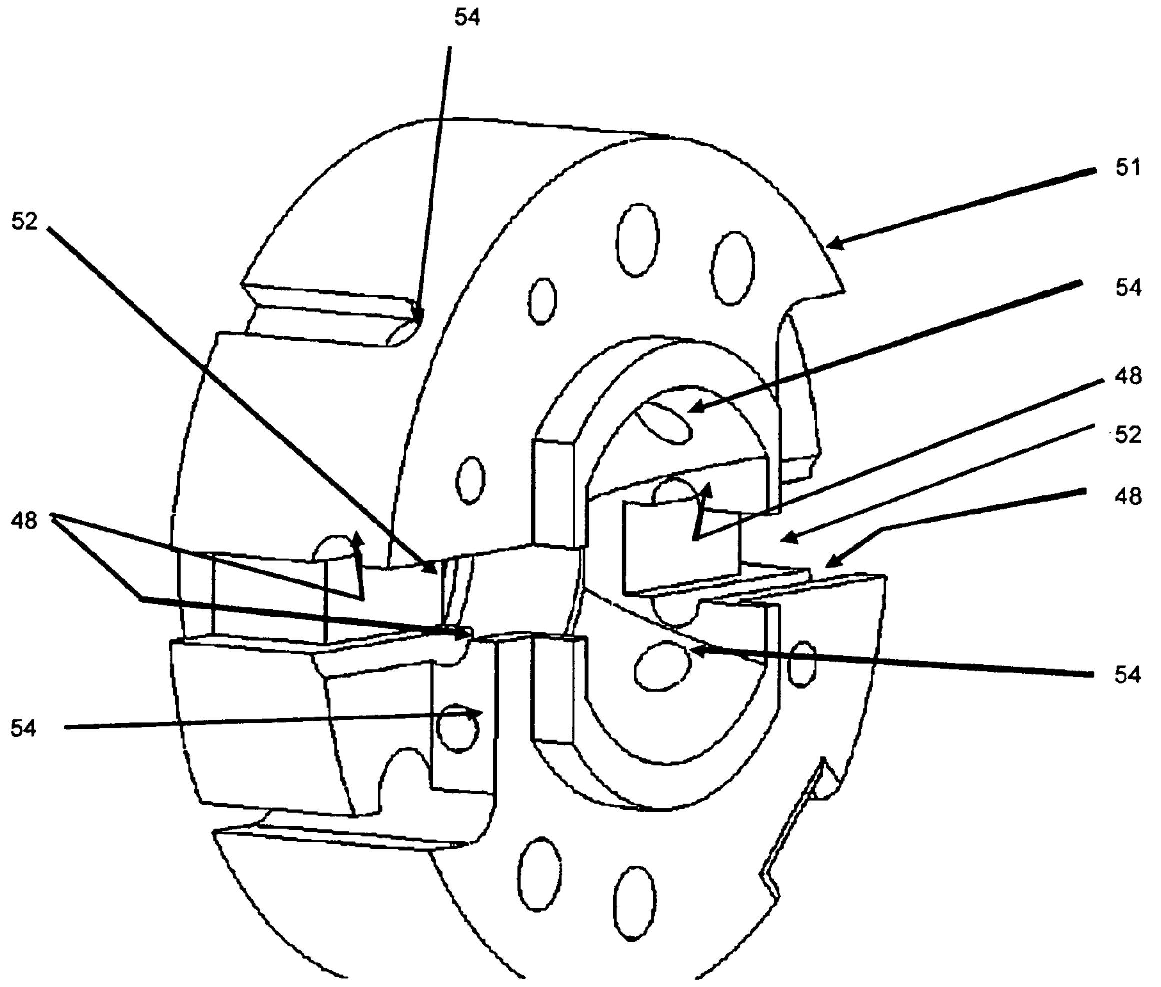
FIG. 5 is a perspective view of a housing showing pressure relief channels.

Further benefits can be gained by providing additional pressure relief channels radially in the housing, as close as is practicable to the brushes. This is illustrated in FIG. 5, where a typical motor bell end housing 51 shows the basic pressure relief channels 48 implemented in the brush-locating slot 52, and extra adjacent pressure relief channels 54 are drilled or formed into the housing 51. It will be noticed that the channels are on both the leading and trailing sides of the brushes in this preferred embodiment, to facilitate the reduction of brush lift when the motor is driven in the reverse direction.

It will be apparent to one skilled in the art that FIG. 5 is intended only to illustrate an embodiment of the present invention and is not meant to be generally representative of the present invention in its entirety. The present invention comprises means whereby the fluid can avoid momentum transfer into the brushes by providing two or more channels (i.e. at least one, preferably two per brush) that enable viscous fluid a direct means of radial exit along the direction of the brush, potentially reducing the brush lift due to the fluid being forced between rotating commutator and its associated brushes. It is further understood that the dimensions of the radial channel(s) are to be sufficient to effectively by-pass the viscous fluid without causing significant frictional drag of the fluid along the channel(s) for a given commutator's maximum rotational speed.

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. The invention is therefore to be considered limited solely by the scope of the appended claims.

Embodiments of the invention in which an exclusive property or privilege is claimed are defined as follows:

1. A brush and brush housing arrangement for use with an electric brushed motor, the brush and brush housing arrangement comprising a brush housing containing oil and at least one brush disposed in the oil, and also comprising pressure relief means for allowing reduction of brush lift in the electric brushed motor, the pressure relief means comprising at least one pressure relief channel in the brush housing separated from the at least one brush by a portion of the brush housing, the at least one pressure relief channel having an inlet facing a curved surface of a commutator of the electric brushed motor when the electric brushed motor is in use.

2. The brush and brush housing arrangement of claim 1 wherein the pressure relief means further comprises at least one additional pressure relief channel in the brush housing immediately adjacent and radially disposed to a leading face of the at least one brush.

3. The brush and brush housing arrangement of claim 1 wherein the pressure relief means further comprises at least one additional pressure relief channel in the brush housing immediately adjacent and radially disposed to leading and trailing faces of the at least one brush.

4. The brush and brush housing arrangement of claim 1 wherein the pressure relief means further comprises at least one additional radially-disposed pressure relief channel in a leading face of the at least one brush.

5. The brush and brush housing arrangement of claim 1 wherein the pressure relief means further comprises at least one additional radially-disposed pressure relief channel in leading and trailing faces of the at least one brush.

6. The brush and brush housing arrangement of claim 1 wherein the at least one pressure relief channel is radially-disposed.

7. A brush housing for use with an electric brushed motor, the brush housing containing oil and comprising at least one brush-locating slot and pressure relief means for allowing reduction of brush lift in the electric brushed motor, both the slot and pressure relief means containing oil, the pressure relief means comprising at least one pressure relief channel in the brush housing separated from the at least one brush-locating slot by a portion of the brush housing, the at least one pressure relief channel having an inlet facing a curved surface of a commutator of the electric brushed motor when the electric brushed motor is in use.

8. The brush housing of claim 7 wherein the pressure relief means further comprises at least one additional pressure relief channel in the brush housing immediately adjacent and radially disposed to a leading face of the at least one brush-locating slot.

9. The brush housing of claim 7 wherein, the pressure relief means further comprises at least one additional pressure relief channel in the brush housing immediately adjacent and radially disposed to leading and trailing faces of the at least one brush-locating slot.

10. The brush housing of claim 7 further comprising a brush located in the at least one brush-locating slot and wherein the pressure relief means further comprises at least one additional radially-disposed pressure relief channel in a leading face of the brush.

11. The brush housing of claim 7 further comprising a brush located in the at least one brush-locating slot and wherein the pressure relief means further comprises at least one additional radially-disposed pressure relief channel in leading and trailing faces of the brush.

12. The brush housing of claim 7 wherein the at least one pressure relief channel is radially-disposed.

13. The brush housing of any one of claims 10 and 11 wherein the at least one additional radially-disposed pressure relief channel has a width of at least 25% to 35% of the width of the brush.

14. The brush housing of any one of claims 10 and 11 wherein the at least one additional radially-disposed pressure relief channel has a depth of at least 20% of the depth of the brush.

* * * * *